United States Patent
Seki et al.

(10) Patent No.: US 9,547,171 B2
(45) Date of Patent: Jan. 17, 2017

(54) OPTICAL SCANNING SYSTEM

(71) Applicant: NALUX CO., LTD., Osaka-shi, Osaka (JP)

(72) Inventors: Daisuke Seki, Osaka (JP); Takatoshi Suzuki, Osaka (JP); Tomohito Kuwagaito, Osaka (JP)

(73) Assignee: NALUX CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 14/872,240

(22) Filed: Oct. 1, 2015

(65) Prior Publication Data

US 2016/0033762 A1 Feb. 4, 2016

Related U.S. Application Data

(63) Continuation of application No. PCT/JP2014/058247, filed on Mar. 25, 2014.
(Continued)

(51) Int. Cl.
*G02B 26/08* (2006.01)
*G02B 26/12* (2006.01)
*G02B 3/14* (2006.01)

(52) U.S. Cl.
CPC ............... *G02B 26/128* (2013.01); *G02B 3/14* (2013.01); *G02B 26/12* (2013.01); *G02B 26/124* (2013.01)

(58) Field of Classification Search
CPC ....... G02B 26/124; G02B 3/14; G02B 26/128; G02B 26/12; B41J 2/471
(Continued)

(56) References Cited

U.S. PATENT DOCUMENTS 4,733,064 A    3/1988   Ishikawa
5,033,806 A    7/1991   Tomita et al.
(Continued)

FOREIGN PATENT DOCUMENTS

JP    61-185716 A    8/1986
JP    2-293809 A    12/1990
(Continued)

OTHER PUBLICATIONS

International Search Report and Written Opinion dated Jun. 17, 2014 corresponding to International Patent Application No. PCT/JP2014/058247 and English translation thereof.

*Primary Examiner* — James Phan
(74) *Attorney, Agent, or Firm* — Squire Patton Boggs (US) LLP

(57) ABSTRACT

An optical scanning system includes a variable-focus element, an imaging lens and a deflector, wherein the reciprocal of the focal length f of the variable-focus element is changed from $1/f_{MIN}$ to $1/f_{MAX}$, and for the case that the equation $$1/f = \{(1/f_{MAX}) + (1/f_{MIN})\}/2$$

holds, a beam which has passed through the variable-focus element is a divergent beam, and $$x_2 + \frac{x_2^2}{x_1} > x_3 \quad (1)$$

is satisfied, where $x_1$ represents a distance from a virtual image point of the divergent beam to the principal point on the entry side of the variable-focus element, $x_2$ represents a distance from the principal point on the exit side of the variable-focus element to the principal point on the entry
(Continued)

side of the imaging lens, and x3 represents a distance from the principal point on the exit side of the imaging lens to an image point.

6 Claims, 7 Drawing Sheets

Related U.S. Application Data

(60) Provisional application No. 61/807,546, filed on Apr. 2, 2013.

(58) Field of Classification Search
USPC .................................. 347/243–244, 258–261
See application file for complete search history.

(56) References Cited

U.S. PATENT DOCUMENTS

| | | |
|---|---|---|
| 5,541,761 A | 7/1996 | Shibaguchi |
| 5,587,826 A | 12/1996 | Shibaguchi |
| 5,610,758 A | 3/1997 | Sumi |
| 5,696,622 A | 12/1997 | Sumi |
| 5,757,549 A | 5/1998 | Sumi |
| 2010/0026777 A1* | 2/2010 | Mochizuki ........... G02B 26/124 347/224 |
| 2013/0286362 A1 | 10/2013 | Imai |

FOREIGN PATENT DOCUMENTS

| | | |
|---|---|---|
| JP | 7-225349 A | 8/1995 |
| JP | 7-333539 A | 12/1995 |
| WO | WO 2012/111698 A1 | 8/2012 |

* cited by examiner

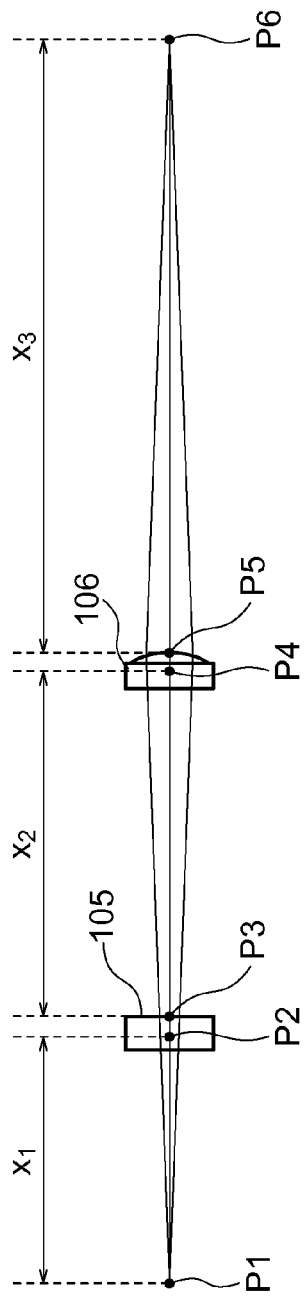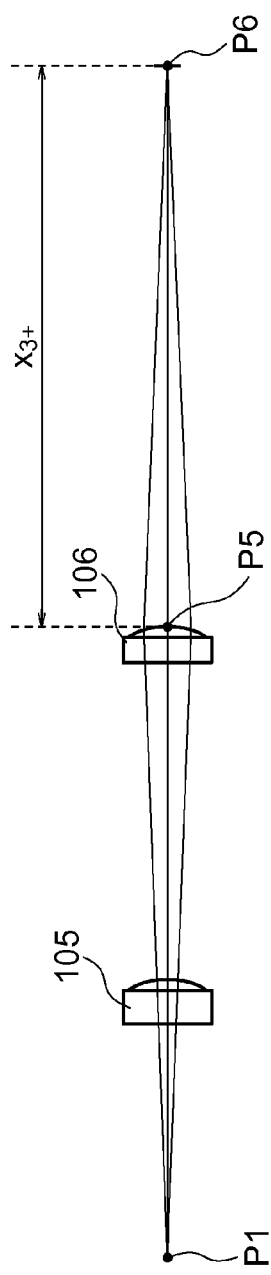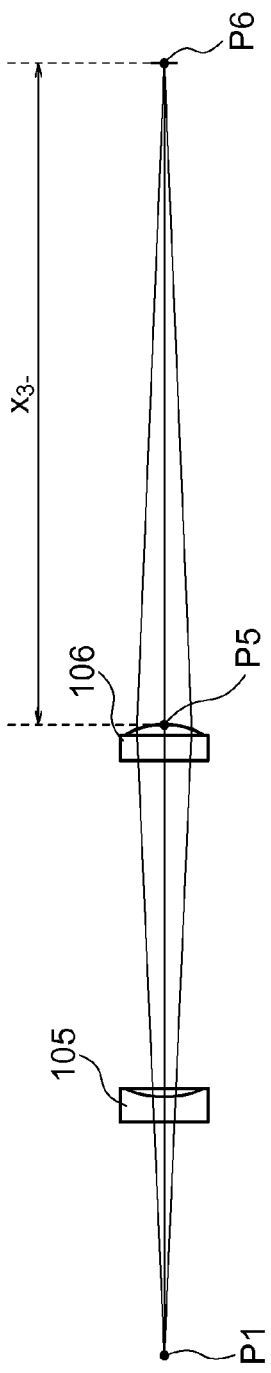

OPTICAL SCANNING SYSTEM

TECHNICAL FIELD

The present invention relates to an optical scanning system which uses a variable-focus element.

BACKGROUND ART

In the measuring mechanism or the drawing mechanism of a laser printer, an optical scanning system is employed. The optical scanning system makes a beam emitted by a light source such as a laser diode pass through a condenser lens, deflects the beam by a deflector such as a polygon mirror or a swing mirror, and makes the beam form an image on the image plane of the scanning beam. In the optical scanning system for a laser printer, for example, it is important to keep the beam spot diameter constant for the whole scanned area (along the whole length of the scanning line).

Conventionally, in order to realize a constant beam spot diameter along the whole length of the scanning line, a long-length imaging lens is commonly arranged between the deflector and the image plane. However, the long-length imaging lens is not only expensive, but also requires a larger space for arrangement, and therefore an apparatus containing the scanning optical system is upsized.

Under the above-described situation, an optical scanning system which does not use a long-length imaging lens and uses a variable-focus element, which is capable of changing the focal point position in synchronization with scanning has been proposed. Refer to JPH02-293809A, for example. As variable-focus elements, a variable-focus element which is configured to change the refractive index of an electro-optic crystal by applying voltage across it, a variable-focus mirror which is made by making a surface of a piezoelectric bimorph a mirror surface, a variable-focus lens which is configured to electrically control a shape of an interface between two kinds of liquids which have different refractive indexes, a mechanism for directly moving a lens by the use of a linear motor, a piezoelectric element or the like, and so on are known. Refer to JPS61-185716A, for example.

The spot diameter $\omega'$ at the intersection point between the image plane of the scanning beam and the principal ray on the plane perpendicular to the principal ray has the following relationship with wavelength $\lambda$ of the light source and the numerical aperture NA.

$$\omega' \propto \frac{\lambda}{NA} \qquad A$$

When the beam is made to form an image on the image plane of the scanning beam by a variable-focus element, the distance along the beam path from the deflector to the image point at the center of the scanning line is smaller than the distance along the beam path from the deflector to the image point at each end of the scanning line. Accordingly, the numerical aperture NA (center) at the center of the scanning line is greater than the numerical aperture NA (end) at each end of the scanning line. As a result, the spot diameter $\omega'$ at the image point at each end of the scanning line is greater than the spot diameter $\omega$ at the image point at the center of the scanning line, and therefore quality of drawing will deteriorate.

In order to prevent the spot diameter from becoming greater at each end of the scanning line as described above, an optical system in which a variable-focus lens system and a fixed-focus lens system are arranged a distance away from each other, the distance corresponding to the focal length of the fixed-focus lens system, has been proposed. Refer to JPH07-225349A, for example.

In this conventional optical system, however, a variable-focus optical system in which a number of fixed-focus lenses and a number of variable-focus lens are combined besides the imaging lens is employed, and therefore the optical system requires a relatively complicated structure and high costs. In the optical system, there is an idea that the fixed-focus lenses described above are also used as the imaging lens for the image plane of the scanning beam for a simpler structure. However, in this case, the focal length of the fixed-focus lenses becomes greater, and the distance between the variable-focus lens system and the fixed-focus lens system has to be increased. As a result, the apparatus is upsized.

In the above-described optical system, the spot diameter a is kept constant independently of the angle of deflection. However, considering that the beam is obliquely incident onto the image plane of the scanning beam at the incident angle of $\phi$, the spot diameter $\omega$ on the image plane of the beam scanning, which exerts a direct influence upon the quality of drawing can be expressed by the following expression.

$$\omega = \frac{\omega'}{\cos\phi} \propto \frac{\lambda}{NA\cos\phi} \qquad B$$

Accordingly, in order to keep the spot diameter $\omega$ on the image plane of the beam scanning constant along the whole length of the scanning line, the numerical aperture NA (end) at each end of the scanning line has to be made greater than the numerical aperture NA (center) at the center of the scanning line.

Conventionally, a compact optical scanning system in which the spot diameter $\omega$ on the image plane of the beam scanning can be kept constant along the whole length of the scanning line has not been developed.

Patent Documents

Patent document 1: JPH02-293809A (Japanese Patent No. 2790851)
Patent document 2: JPS61-185716A
Patent document 3: JPH07-225349A (Japanese Patent No. 3442845)

Accordingly, there is a need for a compact optical scanning system in which the spot diameter $\omega$ on the image plane of the beam scanning can be kept even along the whole length of the scanning line. The object of the present application is to provide a compact optical scanning system in which the spot diameter $\omega$ on the image plane of the beam scanning can be kept even along the whole length of the scanning line.

SUMMARY OF INVENTION

An optical scanning system according to the present invention is that for scanning a plane with a beam emitted by a light source. The system includes a variable-focus element, an imaging lens and a deflector, wherein the reciprocal of the focal length f of the variable-focus element is changed from the minimum value $1/f_{MIN}$ to the maximum value $1/f_{MAX}$, and for the case that the equation $$1/f = \{(1/f_{MAX}) + (1/f_{MIN})\}/2$$

holds, the beam which has passed through the variable-focus element is a divergent beam at a point just behind the variable-focus element, and $$x_2 + \frac{x_2^2}{x_1} > x_3 \quad (1)$$

is satisfied, where $x_1$ represents a distance from a virtual image point of the divergent beam to the principal point on the entry side of the variable-focus element, $x_2$ represents a distance from the principal point on the exit side of the variable-focus element to the principal point on the entry side of the imaging lens and $x_3$ represents a distance from the principal point on the exit side of the imaging lens to an image point.

Since Expression (1) is satisfied in the present invention, the numerical aperture at each end of the scanning line can be made greater than the numerical aperture at the center of the scanning line. Accordingly, an increase in the spot diameter at each end of the scanning line, which is caused by an obliquely incident beam, can be balanced with the increase in the numerical aperture.

In an optical scanning system according to a first embodiment of the present invention, $$|x_1| < 3.2 x_3 \quad (2)$$

and $$x_2 < 0.8 x_3 \quad (3)$$

are further satisfied.

Since Expressions (2) and (3) are satisfied in the present embodiment, the optical scanning system can be downsized.

In optical scanning system according to a second embodiment of the present invention, when $\Delta f$ is defined as $$\Delta f = \frac{2}{\frac{1}{f_{max}} - \frac{1}{f_{min}}}, \quad (4)$$

$$0.035 < \frac{x_1(x_1 x_2 + x_2^2 - x_1 x_3)}{\Delta f (x_1 + x_2)^2} < 0.5 \quad (5)$$

is further satisfied.

Since Expression (5) is satisfied in the present embodiment, a ratio of the numerical aperture at each end of the scanning line to the numerical aperture at the center of the scanning line can be appropriately determined.

In an optical scanning system according to a third embodiment of the present invention, the plane is a flat plane and when a height from the center to each end along a scanning line on the flat plane is represented as H, a focal length of the imaging lens in a cross section of the main scanning direction, in which the beam moves for scanning, is represented as $f_2$, and $\Delta f$ is defined as $$\Delta f = \frac{2}{\frac{1}{f_{max}} - \frac{1}{f_{min}}}, \quad (4)$$

$$\left| -\frac{(x_{3-} - x_{3+})^2}{H^2} + \frac{x_1(f_2 - x_2)}{\Delta f(x_1 + x_2 - f_2)} \right| < 0.05 \quad (6)$$

is further satisfied, where $$x_{3+} = \frac{f_2^2 (x_1 - \Delta f)}{(x_1 + x_2 - f_2)(x_1 - \Delta f) - x_1^2} + f_2 \quad (7)$$

and $$x_{3-} = \frac{f_2^2 (x_1 + \Delta f)}{(x_1 + x_2 - f_2)(x_1 + \Delta f) - x_1^2} + f_2. \quad (8)$$

Since Expression (6) is satisfied in the present embodiment, the numerical aperture at each end of the scanning line increases, and therefore an increase in the spot diameter at each end of the scanning line, which is caused by an oblique incident beam with an incidence angle of φ, can be balanced with the increase in the numerical aperture. As a result, variation in the spot diameter across the scanning line can be made smaller than 5%.

An optical scanning system according to a fourth embodiment of the present invention, further includes a condenser lens that is installed on the light source side of the imaging lens and is configured to move in the direction of the optical axis such that the beam forms an image on the plane, wherein provided that the condenser lens and a virtual variable-focus element are fixed at the center of the moving range, the minimum value $1/f_{MIN}$ and the maximum value $1/f_{MAX}$ of the reciprocal of the focal length f of the virtual variable-focus element are determined such that the change of the position of the image caused by the movement of the condenser lens is reproduced and the virtual variable-focus element is regarded as the variable-focus element.

In the present embodiment, by the use of the condenser lens that is configured to move in the direction of the optical axis such that the beam forms an image on the light receiving surface, an increase in the spot diameter at each end of the scanning line, which is caused by an obliquely incident beam, can be balanced.

In an optical scanning system according to a fifth embodiment of the present invention, the focal length of the imaging lens in the main scanning direction and the focal length of the imaging lens in the sub scanning direction are different from each other.

In the present embodiment, by making the focal length of the imaging lens in the main scanning direction and that in the sub scanning direction different from each other, a linear image can be formed on a reflecting surface of the deflector for optical face tangle error correction, or mirrors of the deflector can be downsized.

BRIEF DESCRIPTION OF DRAWINGS

FIG. 2A shows the state in which $f = f_{MEAN}$;
FIG. 2B shows the state in which $f = f_{MAX}$;
FIG. 2C shows the state in which $f = f_{MIN}$.

DESCRIPTION OF EMBODIMENTS

Figure 1:
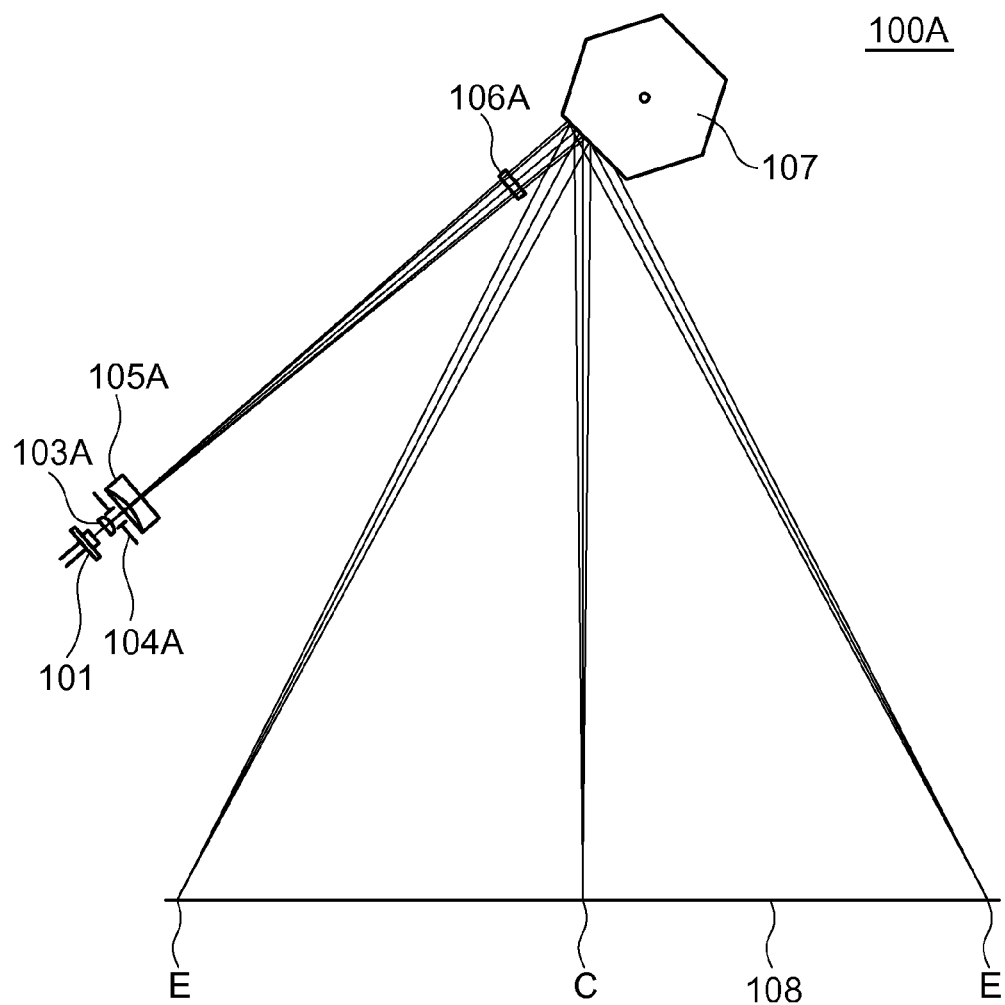
FIG. 1 shows an arrangement of the optical scanning system 100A of Example 1.

FIG. 1 shows an arrangement of an optical scanning system 100A according to an embodiment of the present invention. The embodiment corresponds to Example 1 that will be described later. The optical scanning system 100A includes a condenser lens 103A, an aperture 104A, a variable-focus element 105A, an imaging lens 106A and a deflector 107 such as a polygon mirror. Light emitted by a laser diode light source 101, wavelength of which is 780 nm, is converted into a predetermined divergent beam by the condenser lens 103A, made to pass through the variable-focus element 105A and the imaging lens 106A and deflected by the deflector 107 such that the beam scans a light receiving surface 108 in the horizontal direction in FIG. 1. The variable-focus element 105A is controlled such that the beam constantly forms an image on the receiving surface during the period of the scanning. In FIG. 1, the center of the scanning line on the light receiving surface 108 is represented as C and the both ends are represented as E.

FIGS. 2A, 2B and 2C illustrate how the variable-focus element functions. In FIGS. 2A, 2B and 2C, the condenser lens, the aperture and the deflector have been omitted. In FIGS. 2A, 2B and 2C, P1 represents the virtual image point of the divergent beam, P2 represents the principal point on the entry side of the variable-focus element 105, P3 represents the principal point on the exit side of the variable-focus element 105, P4 represents the principal point on the entry side of the imaging lens 106, P5 represents the principal point on the exit side of the imaging lens 106, and P6 represents the image point of the beam.

It is assumed that the reciprocal of the focal length f of the variable-focus element 105 is changed from the minimum value $1/f_{MIN}$ to the maximum value $1/f_{MAX}$ such that the beam constantly forms an image on the light receiving surface during the period of the scanning. When $$1/f = \{(1/f_{MAX}) + (1/f_{MIN})\}/2 = 1/f_{MEAN},$$

the distance from the virtual image point P1 of the divergent beam to the principal point P2 on the entry side of the variable-focus element 105 is represented as $x_1$, the distance from the principal point P3 on the exit side of the variable-focus element 105 to the principal point P4 on the entry side of the imaging lens 106 is represented as $x_2$, and the distance from the principal point P5 on the exit side of the imaging lens 106 to the image point P6 is represented as $x_3$.

FIG. 2A shows the state in which $f = f_{MEAN}$.

FIG. 2B shows the state in which $f = f_{MAX}$. In this state, the distance from the principal point P5 on the exit side of the imaging lens 106 to the image point P6 is represented as $x_{3+}$. $x_{3+}$ corresponds to the distance along the path of the principal ray of the beam from the principal point on the exit side of the imaging lens 106A to the center C of the scanning line on the light receiving surface 108.

FIG. 2C shows the state in which $f = f_{MIN}$. In this state, the distance from the principal point P5 on the exit side of the imaging lens 106 to the image point P6 is represented as $x_{3-}$. $x_{3-}$ corresponds to the distance along the path of the principal ray of the beam from the principal point on the exit side of the imaging lens 106A to each end E of the scanning line on the light receiving surface 108.

Based on paraxial approximation of the simplified optical system shown in FIGS. 2A, 2B and 2C, how the optical scanning system according to the present invention functions will be described. It is assumed that the reciprocal of the focal length of the variable-focus element 105 ranges from $-1/\Delta f$ ($-\Delta f$ corresponds to $f = f_{MIN}$) to $+1/\Delta f$ ($+\Delta f$ corresponds to $f = f_{MAX}$) when power of 0 (which corresponds to an afocal system) is used as a reference.

NA on the virtual image side is represented as NAo, NA on the image side is represented as NAi, the magnification at the variable-focus element is represented as $\beta_1$, and the magnification at the imaging lens is represented as $\beta_2$. A relationship between NAi and NAo can be expressed by the following equations.

$$NA_o = -\beta_1 \beta_2 NA_i \tag{9}$$

$$\frac{NA_i}{NA_o} = \frac{1}{-\beta_1 \beta_2} = M \tag{10}$$

M is a ratio of the numerical aperture NAi on the image side to the numerical aperture NAo on the virtual image side.

When the focal length of the variable-focus element is represented as $\Delta f$ and the focal length of the imaging lens is represented as $f_2$, the magnification at the variable-focus element $\beta_1$ and the magnification at the imaging lens $\beta_2$ can be represented by the following equations. The second term of Equation (12) can be obtained by substitution of Equation (7) into the third term of Equation (12). Equation (7) will be described later.

$$\beta_1 = \frac{\Delta f}{x_1 - \Delta f} \tag{11}$$

$$\beta_2 = \frac{\Delta f f_2}{-\beta_1 x_1^2 + \Delta f(x_1 + x_2 - f_2)} = \frac{x_3 - f_2}{f_2} \tag{12}$$

The ratio M obtained when the focal length of the variable-focus element is $+\Delta f$ is represented as $M_+$ and the ratio M obtained when the focal length of the variable-focus element is $-\Delta f$ is represented as $M_-$. A relative difference K between the ratio $M_+$ at the center C of the scanning line and the ratio $M_-$ at each end E of the scanning line can be represented by the following equation.

$$K = \frac{M_- - M_+}{M_- + M_+} \tag{13}$$

Using Equations (10) to (12), the above-described equation can be changed into the following one.

$$K = \frac{x_1(x_1 x_2 + x_2^2 - x_1 x_3)}{\Delta f(x_1 + x_2)^2} \tag{14}$$

K should be positive in order that NAi at each end E is greater than that at the center C. Since $x_1$ and $\Delta f$ is positive, the following expression has to be satisfied in order that K is positive.

$$x_1 x_2 + x_2^2 - x_1 x_3 > 0 \tag{15}$$

The following expression can be obtained by changing Expression (15).

$$x_2 + \frac{x_2^2}{x_1} > x_3 \quad (1)$$

For downsizing of the whole optical scanning system, reducing the distance $x_2$ between the lenses is effective. However, when $x_1$ is relatively great and the beam becomes close to a parallel beam immediately after passing through the variable-focus element, the value of $x_2$ cannot be made smaller than that of $x_3$. Accordingly, for downsizing of the apparatus, it is effective to reduce the value of $x_1$ such that the beam is more widely diverged immediately after passing through the variable-focus element. By making the absolute value of $x_1$ less than 3.2 times $x_3$, $x_2$ can be significantly reduced (0.8 times as great as $x_3$).

$$|x_1| < 3.2 x_3 \quad (2)$$

$$x_2 < 0.8 x_3 \quad (3)$$

Because of the limited performance of the deflector and the like, the maximum incident angle φ of the scanning beam to the image plane is approximately 60 degrees at maximum. On the other hand, when the maximum incident angle φ is below 15 degrees, the optical path length and the size of the condenser lens become larger, and therefore the whole apparatus becomes larger. On this occasion, the range of the relative difference K concerning NAi, which is used for the correction can be expressed by the following Expression (16). In the range of K which does not satisfy Expression (16), an amount of correction is excessive and such an excessive amount of correction makes the spot diameter on the periphery excessively small.

$$0.035 < K < 0.5 \quad (16)$$

Substituting Equation (14) in Expression (16) yields the following expression.

$$0.035 < \frac{x_1(x_1 x_2 + x_2^2 - x_1 x_3)}{\Delta f (x_1 + x_2)^2} < 0.5 \quad (5)$$

The distance $x_3$ from the principal point on the exit side of the imaging lens to the image point varies between $x_{3+}$ and $x_{3-}$ as the focal length of the variable-focus element varies between $+\Delta f$ and $-\Delta f$.

$$x_{3+} = \frac{f_2^2 (x_1 - \Delta f)}{(x_1 + x_2 - f_2)(x_1 - \Delta f) - x_1^2} + f_2 \quad (7)$$

$$x_{3-} = \frac{f_2^2 (x_1 + \Delta f)}{(x_1 + x_2 - f_2)(x_1 + \Delta f) - x_1^2} + f_2 \quad (8)$$

In general, when the focal length f of a lens and the distance x from an object to the principal point on the entry side of the lens are determined, the distance x' from the principal point on the exit side of the lens to the image plane is detemined by the following equation.

$$f/(x-f) = -(x'-f)/f$$

Accordingly, in FIG. 2, a position of a first image formed by the variable-focus element, of the vertual image can be obtained, and then a position of a second image formed by the imaging lens 106, of the first image can be calculated. Thus, Equations (7) and (8) can be derived.

Figure 3:
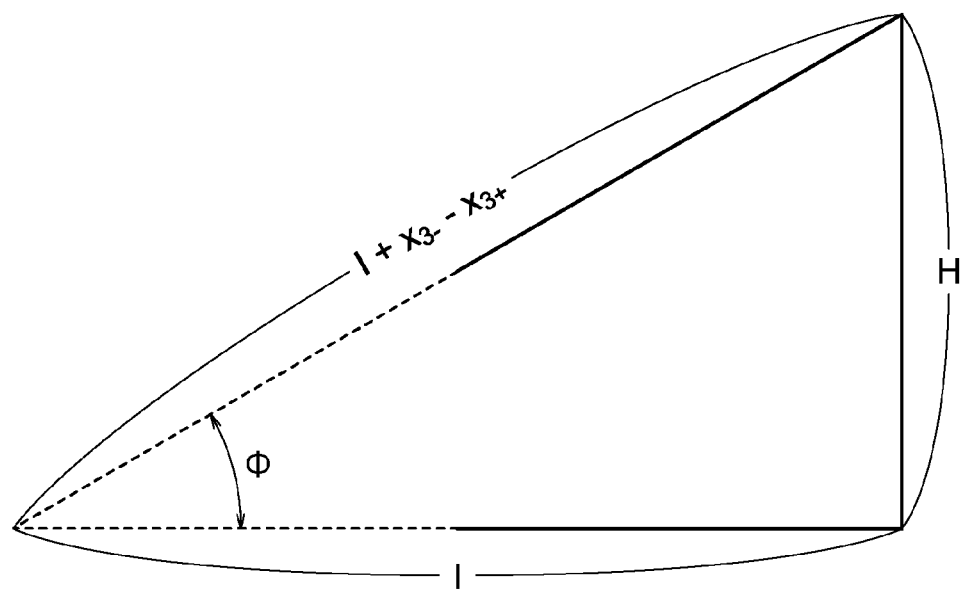
FIG. 3 illustrates how the variable-focus element performs positional corrections of the image surface.

FIG. 3 illustrates how the variable-focus element performs positional corrections of the image surface. In FIG. 3, l represents the distance from the point of reflection on the deflector to the center C of the scanning line along the path of the principal ray of the beam which reaches the center C of the scanning line. H represents the distance from the center C of the scanning line to each end E of the scanning line. Provided that the curverture of the image plane is corrected by the variable-focus element, the following equation holds.

$$(l + x_{3-} - x_{3+})^2 - l^2 = H^2 \quad (17)$$

Accordingly, cos φ which represents a change of the spot diameter when the incidence angle of the beam onto the image plane (light receiving surface) is φ, can be expressed by the following equation by the use of Equation (17).

$$\cos\phi = \frac{1}{1 + x_{3-} - x_{3+}} = \frac{H^2 - (x_{3-} - x_{3+})^2}{H^2 + (x_{3-} - x_{3+})^2} \quad (18)$$

A relative difference J of effect of oblique incidence for the beam which reaches a point on the scanning line between the center and the both ends can be expressed by the following equation by the use of Equation (18).

$$J = \frac{\cos\phi - 1}{\cos\phi + 1} = -\frac{(x_{3-} - x_{3+})^2}{H^2} \quad (19)$$

According to Expression B, the spot diameter is kept constant along the scanning line when an effect of increase of M, that is, an effect of increase of NA (a positive value of K) and an effect of decrease of cos φ caused by increase of the incidence angle φ balance each other, in other words, when the following equation holds.

$$J + K = 0 \quad (20)$$

When a spot diameter change up to ±5% is allowable, the following expression should be satisfied.

$$|J + K| < 0.05 \quad (21)$$

Substituting Equations (14) and (19) in Expression (21) yields the following expression.

$$\left| -\frac{(x_{3-} - x_{3+})^2}{H^2} + \frac{x_1(f_2 - x_2)}{\Delta f(x_1 + x_2 - f_2)} \right| < 0.05 \quad (6)$$

Examples and a comparative example will be described below.

Example 1

FIG. 1 shows an arrangement of the optical scanning system 100A of Example 1. The optical scanning system 100A includes the condenser lens 103A, the aperture 104A, the variable-focus element 105A, the imaging lens 106A and the deflector 107 such as a polygon mirror. Light emitted by the laser diode light source 101, wavelength of which is 780 nm, is converted into a predetermined divergent beam by the condenser lens 103A, made to pass through the variable-focus element 105A and the imaging lens 106A and deflected by the deflector 107 such that the beam scans a light receiving surface 108 in the horizontal direction in FIG. 1. The variable-focus element 105A is controlled such that the beam constantly forms an image on the light receiving surface during the period of the scanning. In FIG. 1, the center of the scanning line on the light receiving surface 108 is represented as C and the both ends are represented as E.

Table 1 shows numerical data of the optical scanning system 100A of Example 1. As to "space or thickness" in Table 1 and the other tables, for example, "space or thickness" of the datum of light source represents a space between the datum of light source and the entry side surface of the condenser lens which is next to the light source and "space or thickness" of the entry side surface of the condenser lens represents a thickness of the condenser lens. Further, "space or thickness" is that along the optical path of the light which travels from the datum of light source and reaches the center C of the scanning line.

The variable-focus element is a virtual one which has a thickness of 0. However, in FIG. 1, the variable-focus element 105A is drawn as one which has a predetermined thickness for the sake of better understanding.

TABLE 1

| Item | Space or thickness (mm) | Radius of curvature at center (mm) | Material |
|---|---|---|---|
| Datum of light source | 4.148 | — | — |
| Entry side surface of condenser lens | 2 | 17.751 | BK7 |
| Exit side surface of condenser lens | 1 | −3.662 | — |
| Aperture plane | 3 | — | — |
| Principal point on entry side of variable-focus element | 0 | — | — |
| Principal point on exit side of variable-focus element | 135 | — | — |
| Entry side surface of imaging lens | 2 | 53.442 | BK7 |
| Exit side surface of imaging lens | 23.235 | Infinity | — |
| Deflecting mirror | 206 | — | — |
| Image surface of scanning beam (light receiving surface) | — | — | — |

The material of the condenser lens 103A and the imaging lens 106A is borosilicate glass, the brand name of which is BK7. For light of wavelength of 780 nm, the value of refractive index is 1.511 and the value of Abbe's number is 64.2.

The entry side surface of the condenser lens 103A and the entry side and the exit side surfaces of the imaging lens 106A are spherical or flat. The exit side surface of the condenser lens 103A is defined by the following equations.

$$z = \frac{cr^2}{1 + \sqrt{1 - (1+k)c^2 r^2}} + \sum_n a_{2n} r^{2n} \quad (22)$$

$$r = \sqrt{x^2 + y^2} \quad (23)$$

r represents distance from the optical axis, and z represents distance in the direction of the optical axis from the intersection point between the optical axis and the exit side surface of the condenser lens 103A as the reference point. c represents curvature at the center and R represents the radius of curvature at the center. Further, a represents aspherical coefficients and n represents integers.

In the examples and comparative example, the optical axis is the line connecting the center of each optical element and agrees with the path of the primary ray of the beam which reaches the canter C of the scanning line.

Table 2 shows numerical data of the exit side surface of the condenser lens 103A of Example 1. The unit of length in the table is millimeter. The focal length of the condenser lens 103A is 6.1 millimeters.

TABLE 2

| Item | Data (Coefficient) |
|---|---|
| Radius of curvature at center R = 1/c | −3.662 |
| Conic constant k | −0.997 |
| Fourth-order aspherical coefficient a4 | −4.91E−04 |

Example 2

Figure 4:
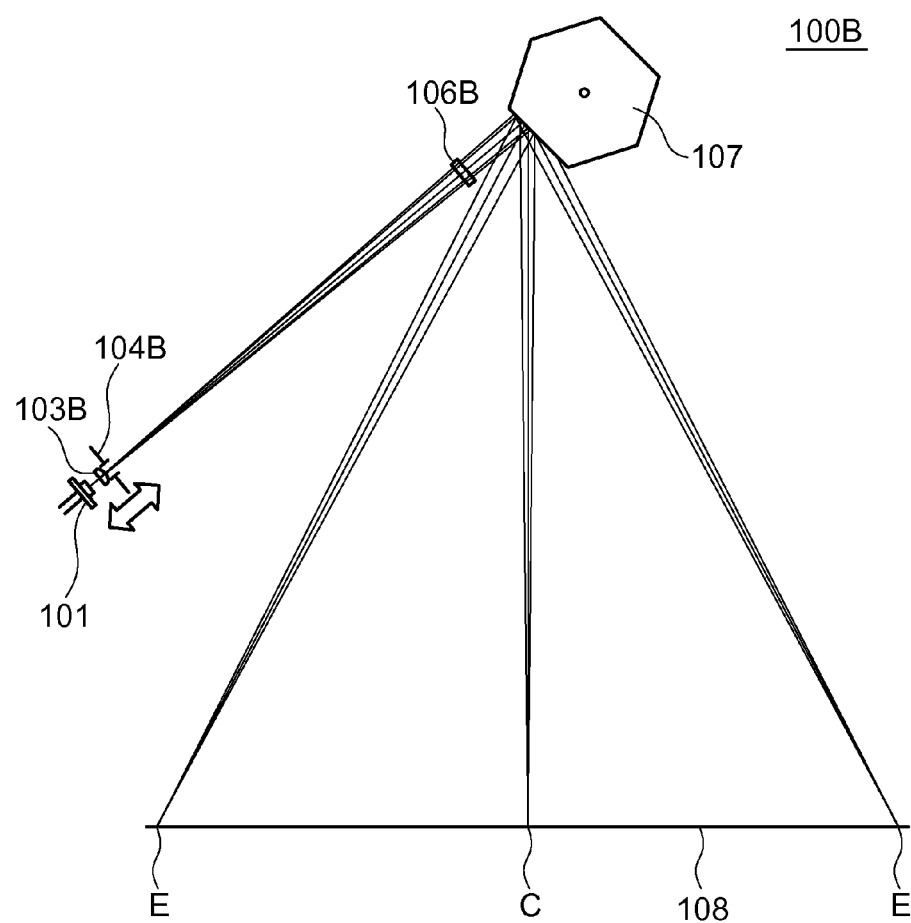
FIG. 4 shows an arrangement of an optical scanning system of Example 2.

FIG. 4 shows an arrangement of an optical scanning system 100B of Example 2. The optical scanning system 100B includes a condenser lens 103 B, an aperture 104B, an imaging lens 106B and a deflector 107 such as a polygon mirror. Light emitted by a laser diode light source 101, wavelength of which is 780 nm, is converted into a predetermined divergent beam by the condenser lens 103B, made to pass through the imaging lens 106B and deflected by the deflector 107 such that the beam scans a light receiving surface 108 in the horizontal direction in FIG. 4. The condenser lens 103B is made to move in the direction of the optical axis in a predetermined section in synchronization with the scanning caused by the deflector 107. Movement of the condenser lens 103B in the direction of the optical axis changes a position of an image of the beam along the optical path. The position of the condenser lens 103B is controlled such that the beam constantly forms an image on the light receiving surface during the period of the scanning. The distance that the condenser lens 103B moves in the direction of the optical axis is 229 micrometers. In FIG. 4, the center of the scanning line on the light receiving surface 108 is represented as C and the both ends are represented as E.

Table 3 shows numerical data of the optical scanning system 100B of Example 2.

TABLE 3

| Item | Space or thickness (mm) | Radius of curvature at center (mm) | Material |
|---|---|---|---|
| Datum of light source | 4.196 (4.105-4.334) | — | — |
| Entry side surface of condenser lens | 2 | 17.751 | BK7 |
| Exit side surface of condenser lens | 1 | −3.662 | — |
| Aperture plane | 134 | — | — |
| Entry side surface of imaging lens | 2 | 53.442 | BK7 |
| Exit side surface of imaging lens | 23.235 | Infinity | — |

TABLE 3-continued

| Item | Space or thickness (mm) | Radius of curvature at center (mm) | Material |
|---|---|---|---|
| Deflecting mirror | 206 | — | — |
| Image surface of scanning beam (light receiving surface) | — | — | — |

The material of the condenser lens 103B and the imaging lens 106B is borosilicate glass, the brand name of which is BK7. For light of wavelength of 780 nm, the value of refractive index is 1.511 and the value of Abbe's number is 64.2.

The entry side surface of the condenser lens 103B and the entry side and the exit side surfaces of the imaging lens 106B are spherical or flat. The exit side surface of the condenser lens 103B is defined by the following equations.

$$z = \frac{cr^2}{1 + \sqrt{1 - (1+k)c^2 r^2}} + \sum_n a_{2n} r^{2n} \quad (22)$$

$$r = \sqrt{x^2 + y^2} \quad (23)$$

Table 4 shows numerical data of the exit side surface of the condenser lens 103B of Example 2. The unit of length in the table is millimeter. The focal length of the condenser lens 103B is 6.1 millimeters.

TABLE 4

| Item | Data (Coefficient) |
|---|---|
| Radius of curvature at center R = 1/c | −3.662 |
| Conic constant k | −0.997 |
| Fourth-order aspherical coefficient a4 | −4.91E−04 |

Example 3

Figure 5:
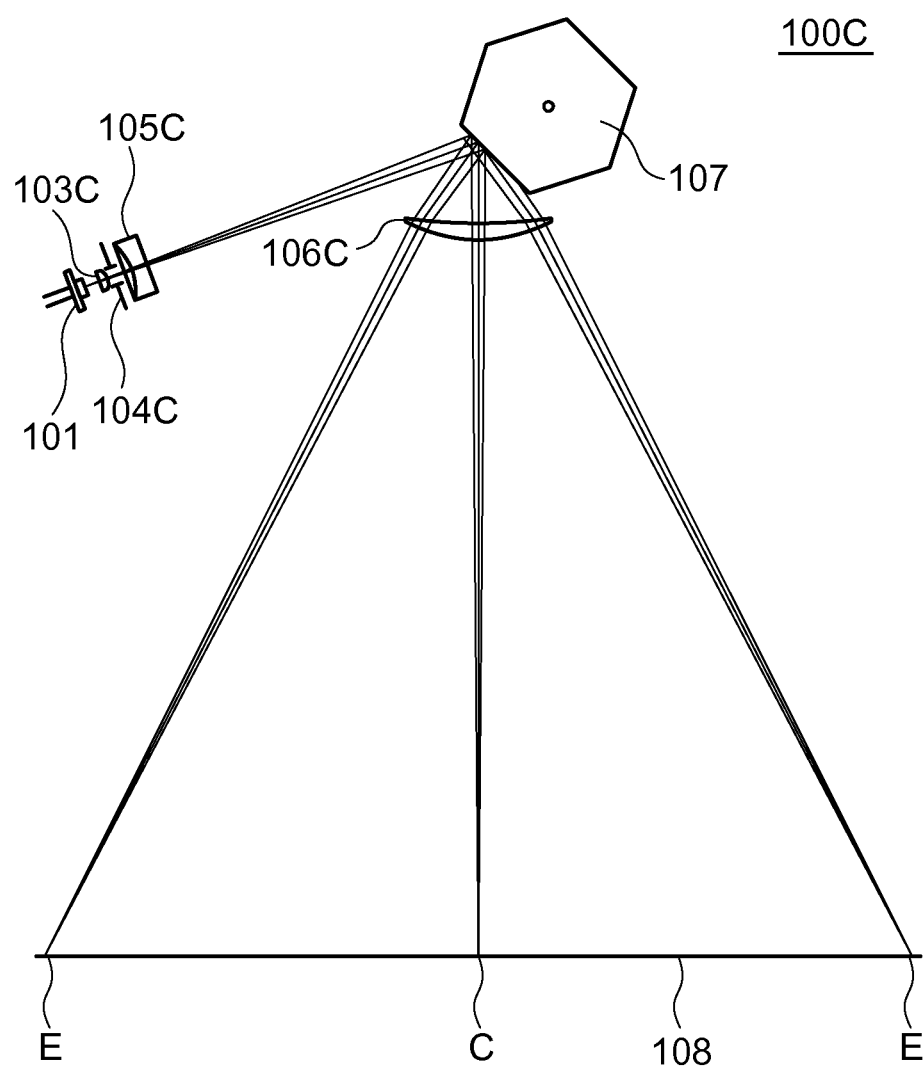
FIG. 5 shows an arrangement of an optical scanning system of Example 3.

FIG. 5 shows an arrangement of an optical scanning system 100C of Example 3. The optical scanning system 100C includes a condenser lens 103C, an aperture 104C, a variable-focus element 105C, an imaging lens 106C and a deflector 107 such as a polygon mirror. Light emitted by a laser diode light source 101, wavelength of which is 780 nm, is converted into a predetermined divergent beam by the condenser lens 103C, made to pass through the variable-focus element 105C and deflected by the deflector 107 such that the beam scans a light receiving surface 108 in the horizontal direction in FIG. 5. Then, the beam passes through the imaging lens 106C. The variable-focus element 105C is controlled such that the beam constantly forms an image on the light receiving surface during the period of the scanning. In FIG. 5, the center of the scanning line on the light receiving surface 108 is represented as C and the both ends are represented as E.

Table 5 shows numerical data of the optical scanning system 100C of Example 3.

The variable-focus element is a virtual one which has a thickness of 0. However, in FIG. 5, the variable-focus element 105C is drawn as one which has a predetermined thickness for the sake of better understanding.

TABLE 5

| Item | Space or thickness (mm) | Radius of curvature at center (mm) | Material |
|---|---|---|---|
| Datum of light source | 4.719 | — | — |
| Entry side surface of condenser lens | 2 | 17.751 | BK7 |
| Exit side surface of condenser lens | 1 | −3.662 | — |
| Aperture plane | 3 | — | — |
| Principal point on entry side of variable-focus element | 0 | — | — |
| Principal point on exit side of variable-focus element | 95 | — | — |
| Deflecting mirror | 20 | — | — |
| Entry side surface of imaging lens | 4 | −96.629 | COP (n = 1.525@780 nm) |
| Exit side surface of imaging lens | 180 | −36.389 | — |
| Image surface of scanning beam (light receiving surface) | — | — | — |

The material of the condenser lens 103C is borosilicate glass, the brand name of which is BK7. For light of wavelength of 780 nm, the value of refractive index is 1.511 and the value of Abbe's number is 64.2. The material of the imaging lens 106C is cyclo-olefin polymer (COP), the brand name of which is ZEONEX E48R. For light of wavelength of 780 nm, the value of refractive index is 1.525 and the value of Abbe's number is 56.0.

The entry side surface of the condenser lens 103C is spherical. The exit side surface of the condenser lens 103C is defined by the following equations.

$$z = \frac{cr^2}{1 + \sqrt{1 - (1+k)c^2 r^2}} + \sum_n a_{2n} r^{2n} \quad (22)$$

$$r = \sqrt{x^2 + y^2} \quad (23)$$

Table 6 shows numerical data of the exit side surface of the condenser lens 103C of Example 3. The focal length of the condenser lens 103C is 6.1 millimeters.

TABLE 6

| Item | Data (Coefficient) |
|---|---|
| Radius of curvature at center R = 1/c | −3.662 |
| Conic constant k | −0.997 |
| Fourth-order aspherical coefficient a4 | −4.91E−04 |

The entry side and exit side surfaces of the imaging lens 106C are troidal surfaces which are obtained by rotating the generatrix defined by the following equation with a diameter Rr.

$$z = \frac{cy^2}{1 + \sqrt{1 - (1+k)c^2 y^2}} + \sum_n \alpha_{2n} y^{2n} \quad (24)$$

Table 7 shows numerical data of the entry side and exit side surfaces of the imaging lens 106C of Example 3. The unit of length in the table is millimeter.

TABLE 7

| Item | Entry side surface | Exit side surface |
|---|---|---|
| Radius of rotation Rr | 253.425 | −73.347 |
| Radius of curvature at center of generatrix R = 1/c | −96.629 | −36.389 |
| Conic constant of generatrix k | 0 | −0.977 |
| Fourth-order aspherical coefficient of generatrix α4 | 3.34E−06 | −6.43E−07 |
| Sixth-order aspherical coefficient of generatrix α6 | 0 | 3.40E−09 |

Comparative Example

Figure 6:
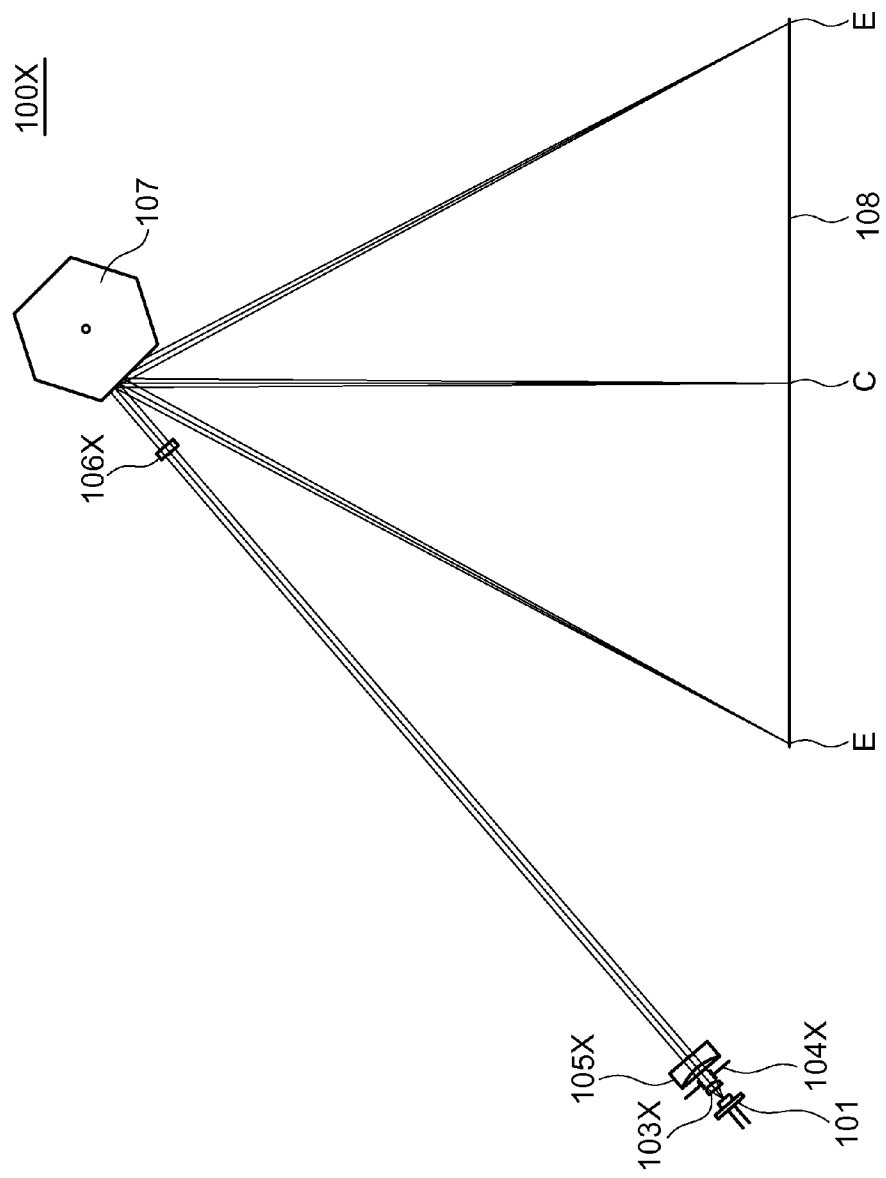
FIG. 6 shows an arrangement of an optical scanning system of Comparative Example.

FIG. 6 shows an arrangement of an optical scanning system 100X of Comparative Example. The optical scanning system 100X includes a condenser lens 103X, an aperture 104X, a variable-focus element 105X, an imaging lens 106X and a deflector 107 such as a polygon mirror. Light emitted by a laser diode light source 101, wavelength of which is 780 nm, is converted into a predetermined divergent beam by the condenser lens 103X, made to pass through the variable-focus element 105X and the imaging lens 106X and deflected by the deflector 107 such that the beam scans a light receiving surface 108 in the horizontal direction in FIG. 6. The variable-focus element 105X is controlled such that the beam constantly forms an image on the light receiving surface during the period of the scanning. In FIG. 6, the center of the scanning line on the light receiving surface 108 is represented as C and the both ends are represented as E.

Table 8 shows numerical data of the optical scanning system 100X of Comparative Example.

The variable-focus element is a virtual one which has a thickness of 0. However, in FIG. 6, the variable-focus element 105X is drawn as one which has a predetermined thickness for the sake of better understanding.

TABLE 8

| Item | Space or thickness (mm) | Radius of curvature at center (mm) | Material |
|---|---|---|---|
| Datum of light source | 10 | — | — |
| Entry side surface of condenser lens | 3 | Flat | BK7 |
| Exit side surface of condenser lens | 1 | 6.209 | — |
| Aperture plane | 3 | — | — |
| Principal point on entry side of variable-focus element | 0 | — | — |
| Principal point on exit side of variable-focus element | 239 | — | — |
| Entry side surface of imaging lens | 2 | Flat | BK7 |

TABLE 8-continued

| Item | Space or thickness (mm) | Radius of curvature at center (mm) | Material |
|---|---|---|---|
| Exit side surface of imaging lens | 25 | 124.446 | — |
| Deflecting mirror | 202.026 | — | — |
| Image surface of scanning beam (light receiving surface) | — | — | — |

The material of the condenser lens 103X and the imaging lens 106X is borosilicate glass, the brand name of which is BK7. For light of wavelength of 780 nm, the value of refractive index is 1.511 and the value of Abbe's number is 64.2.

The entry side and exit side surfaces of the condenser lens 103X and the entry side and the exit side surfaces of the imaging lens 106X are spherical or flat. The focal length of the condenser lens 103X is 6.1 millimeters.

Comparison Between the Examples and the Comparison Example

Table 9 shows important parameters of Examples 1 to 3 and Comparative Example.

TABLE 9

| Parameter | Example 1 | Example 2 | Example 3 | Comparative Example |
|---|---|---|---|---|
| x1 | 42.2 | 41.9 | 131.9 | −282296.0 |
| x2 | 135.0 | 135.2 | 119.1 | 240.3 |
| x3 | 245.2 | 245.2 | 191.7 | 243.2 |
| f_max | 257.5 | 255.0 | 764.4 | 4249.6 |
| f_min | −257.5 | −255.0 | −764.4 | −4249.6 |
| Δf | 257.5 | 255.0 | 764.4 | 4249.6 |
| f2 | 102.9 | 102.9 | 108.7 | 243.4 |
| H | 108.0 | 108.0 | 108.0 | 108.6 |
| A (corresponding to Expression (1)) | 321.9 | 326.1 | 35.0 | −3.1 |
| B (corresponding to Expression (2)) | −742.6 | −742.9 | −481.6 | 281517.6 |
| C (corresponding to Expression (3)) | −61.2 | −61.0 | −34.2 | 45.7 |
| D (corresponding to Expression (5)) | 0.071 | 0.072 | 0.013 | −0.001 |
| 1 | 206.0 | 206.3 | 206.4 | 197.4 |
| x3+ | 231.0 | 231.0 | 178.3 | 229.3 |
| x3− | 257.6 | 257.6 | 204.8 | 257.2 |
| E (corresponding to Expression (6)) | −0.010 | −0.011 | 0.048 | 0.067 |

By the use of FIG. 2, $x_1$, $x_2$, $x_3$, and Δf have been defined as below. It is assumed that the reciprocal of the focal length f of the variable-focus element 105 is changed from the minimum value $1/f_{MIN}$ to the maximum value $1/f_{MAX}$ such that the beam constantly forms an image on the light receiving surface during the period of the scanning. When $$1/f = \{(1/f_{MAX}) + (1/f_{MIN})\}/2 = 1/f_{MEAN},$$

the distance from the virtual image point P1 of the divergent beam to the principal point P2 on the entry side of the variable-focus element 105 is represented as $x_1$, the distance from the principal point P3 on the exit side of the variable-focus element 105 to the principal point P4 on the entry side of the imaging lens 106 is represented as $x_2$, and the distance from the principal point P5 on the exit side of the imaging lens 106 to the image point P6 is represented as $x_3$. Further, Δf is defined as below.

$f_{MAX}=\Delta f$ $f_{MIN}=-\Delta f$

Additional description of Example 2 will be given below. The optical scanning system 100B of Example 2 does not include a variable-focus element. In the optical scanning system 100B of Example 2, a position of an image of the beam along the optical path is changed by the movement of the condenser lens 103B in the direction of the optical axis such that the beam constantly forms an image on the light receiving surface during the period of the scanning. In this case, it is assumed that the condenser lens 103B and a virtual variable-focus element 105' are fixed at the center of the section in which the condenser lens 103B moves in the direction of the optical axis, and the minimum value $1/f_{MIN}$ and the maximum value $1/f_{MAX}$ of the reciprocal of the focal length of the virtual variable-focus element 105' are determined such that the change of the position of the image caused by the movement of the condenser lens 103B in the direction of the optical axis is reproduced. The values of $f_{MIN}$ ($-\Delta f$) and $f_{MAX}$ ($\Delta f$) in Table 9 are determined as described above.

By the use of FIG. 3, l and H have been defined as below. l represents the distance from the point of reflection on the deflector to the center C of the scanning line along the path of the principal ray of the beam which reaches the center C of the scanning line. H represents the distance from the center C of the scanning line to each end E of the scanning line. In the case of Example 3, however, l represents length of the side along the primary ray of the beam which travels toward the center C of the scanning line of the triangle formed by the scanning line on the light receiving surface, the primary ray of the beam which travels toward the center C of the scanning line and the primary ray of the beam which travels toward one of the ends E of the scanning line.

A to E are defined as below and correspond respectively to Expressions (1) to (3), (5) and (6).

$$A = x_2 + \frac{x_2^2}{x_1} - x_3$$

$$B = |x_1| - 3.2x_3$$

$$C = x_2 - 0.8x_3$$

$$D = \frac{x_1(x_1 x_2 + x_2^2 - x_1 x_3)}{\Delta f (x_1 + x_2)}$$

$$E = -\frac{(x_{3-} - x_{3+})^2}{H^2} + \frac{x_1(f_2 - x_2)}{\Delta f (x_1 + x_2 - f_2)}$$

According to Table 9, Examples 1 to 3 satisfy all of Expressions (1) to (3), (5) and (6). On the other hand, Comparative Example does not satisfy any of Expressions (1) to (3), (5) and (6).

Figure 7:
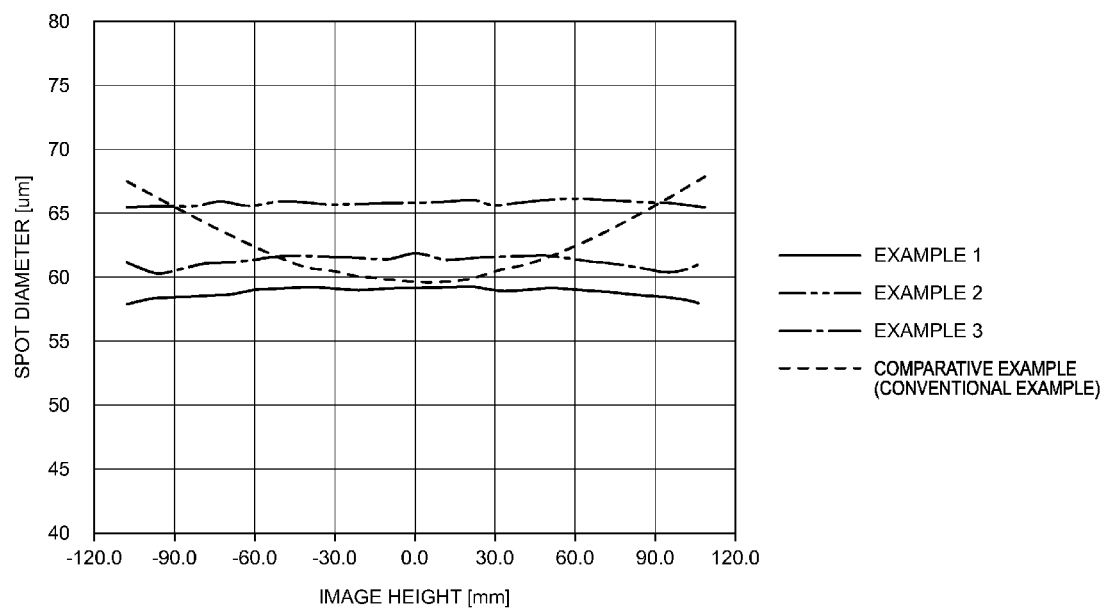
FIG. 7 shows a relationship between position and diameter of the spot formed on the light receiving surface by the beam.

FIG. 7 shows a relationship between position and diameter of the spot formed by the beam on the light receiving surface 108. The horizontal axis of FIG. 7 represents distance from the center C to an arbitrary point on the scanning line on the light receiving surface, that is, image height. The unit is millimeter. The direction from the center C toward one of the two ends of the scanning line is defined as a positive direction, and the direction from the center C toward the other of the two ends of the scanning line is defined as a negative direction. The vertical axis of FIG. 7 represents spot diameter. The unit is micrometer.

As to Examples 1 to 3, the values of the variance of spot diameter across the horizontal axis are smaller than 2 micrometers. As to Comparative Example (Conventional Example), the value of the variance of spot diameter across the horizontal axis is greater than 7 micrometers. Thus, the values of the variance of spot diameter in Examples 1 to 3 are remarkably reduced in comparison with the value of the variance of spot diameter in Comparative Example.

In other preferred embodiments, by making the focal length of the imaging lens in the main scanning direction and that in the sub scanning direction different from each other, a linear image can be formed on a reflecting surface of the deflector for optical face tangle error correction, or mirrors of the deflector can be downsized.

What is claimed is:

1. An optical scanning system for scanning a plane with a beam emitted by a light source, the system comprising a variable-focus element, an imaging lens and a deflector,
    wherein the reciprocal of the focal length f of the variable-focus element is changed from the minimum value $1/f_{MIN}$ to the maximum value $1/f_{MAX}$, and for the case that the equation $$1/f = \{(1/f_{MAX}) + (1/f_{MIN})\}/2$$

holds, the beam which has passed through the variable-focus element is a divergent beam at a point just behind the variable-focus element, and $$x_2 + \frac{x_2^2}{x_1} > x_3 \qquad (1)$$

is satisfied, where $x_1$ represents a distance from a virtual image point of the divergent beam to the principal point on the entry side of the variable-focus element, $x_2$ represents a distance from the principal point on the exit side of the variable-focus element to the principal point on the entry side of the imaging lens and $x_3$ represents a distance from the principal point on the exit side of the imaging lens to an image point.

2. An optical scanning system according to claim 1, wherein $$|x_1| < 3.2 x_3 \qquad (2)$$

and $$x_2 < 0.8 x_3 \qquad (3)$$

are further satisfied.

3. An optical scanning system according to claim 1, wherein when $\Delta f$ is defined as $$\Delta f = \frac{2}{\frac{1}{f_{max}} - \frac{1}{f_{min}}}, \qquad (4)$$

$$0.035 < \frac{x_1(x_1 x_2 + x_2^2 - x_1 x_3)}{\Delta f (x_1 + x_2)^2} < 0.5 \qquad (5)$$

is further satisfied.

4. An optical scanning system according to claim 1, wherein the plane is a flat plane and when a height from the center to each end along a scanning line on the flat plane is represented as H, a focal length of the imaging lens in a cross section of the main scanning direction, in which the beam moves for scanning, is represented as $f_2$, and $\Delta f$ is defined as $$\Delta f = \frac{2}{\frac{1}{f_{max}} - \frac{1}{f_{min}}}, \quad (4)$$

$$\left| -\frac{(x_{3-} - x_{3+})^2}{H^2} + \frac{x_1(f_2 - x_2)}{\Delta f(x_1 + x_2 - f_2)} \right| < 0.05 \quad (6)$$

is further satisfied, where $$x_{3+} = \frac{f_2^2(x_1 - \Delta f)}{(x_1 + x_2 - f_2)(x_1 - \Delta f) - x_1^2} + f_2 \quad (7)$$

and $$x_{3-} = \frac{f_2^2(x_1 + \Delta f)}{(x_1 + x_2 - f_2)(x_1 + \Delta f) - x_1^2} + f_2. \quad (8)$$

5. An optical scanning system according to claim 1, further comprising a condenser lens that is installed on the light source side of the imaging lens and is configured to move in the direction of the optical axis such that the beam forms an image on the plane, wherein provided that the condenser lens and a virtual variable-focus element are fixed at the center of the moving range, the minimum value $1/f_{MIN}$ and the maximum value $1/f_{MAX}$ of the reciprocal of the focal length f of the virtual variable-focus element are determined such that a change of the position of the image caused by the movement of the condenser lens is reproduced and the virtual variable-focus element is regarded as the variable-focus element.

6. An optical scanning system according to claim 1, wherein the focal length of the imaging lens in the main scanning direction and the focal length of the imaging lens in the sub scanning direction are different from each other.

* * * * *